United States Patent Office 3,125,540
Patented Mar. 17, 1964

3,125,540
PREPARATION OF CELLULAR POLYURETHANE PLASTICS RESEMBLING NATURAL SPONGE
Günther Loew, Cologne, and Günther Hörl, Cologne-Flittard, Germany (% Farbenfabriken Bayer A.G., Leverkusen- Bayerwerk, Germany)
No Drawing. Filed July 18, 1960, Ser. No. 43,334
Claims priority, application Germany July 29, 1959
8 Claims. (Cl. 260—2.5)

This invention relates to the production of polyurethane plastics and more particularly to the production of cellular polyurethane plastics having a porous structure resembling that of natural sponge.

It has been proposed heretofore to prepare polyurethane plastics having a nonuniform cellular structure resembling that of natural sponge. However, these plastics have been based on hydroxyl polyesters and organic polyisocyanates or prepolymers obtained from an excess of an organic polyisocyanate and a polyhydric polyalkylene ether. It has not been possible heretofore to prepare cellular polyurethane plastics having a porous structure resembling that of natural sponge by the so-called one-shot process wherein an organic polyisocyanate, water and a polyhydric polyalkylene ether are all mixed together substantially simultaneously.

It has also been proposed heretofore to stabilize the reaction between a polytetramethylene ether glycolpolyisocyanate prepolymer and water with a polydimethyl siloxane. The purpose of using the polydimethyl siloxane is to control the cell structure of the resulting cellular polyurethane plastic so that cells of uniform size are obtained.

It is, therefore, an object of this invention to provide a process for the preparation of cellular polyurethane plastics which have a porous structure resembling that of natural sponge from polyhydric polyalkylene ethers by a one-step process. Still another object of this invention is to provide an improved process for locally stabilizing the reaction between a polyhydric polyalkylene ether and an organic polyisocyanate to produce a cellular polyurethane plastic. A further object of this invention is to provide an improved method of controlling the cell size of cellular polyurethane plastics obtained from polyhydric polyalkylene ethers and organic polyisocyanates.

The foregoing objects and others which will become apparent from the following description are accomplished in accordance with the invention, generally speaking, by providing cellular polyurethane plastics having a porous structure resembling that of natural sponge and a method for the preparation thereof wherein a polyhydric polyalkylene ether, water and an organic polyisocyanate are mixed together substantially simultaneously in the presence of a silicone oil which is insoluble in said polyhydric polyalkylene ether and/or combined with a carrier which is substantially insoluble in said polyhydric polyalkylene ether. Thus, this invention contemplates a process for the preparation of cellular polyurethane plastics which have a porous structure resembling that of natural sponge wherein an organic polyisocyanate is mixed with water and a polyhydric polyalkylene ether in a single step in the presence of a silicone oil which is absorbed on a carrier which is substantially insoluble in said polyhydric polyalkylene ether so that local boiling of the reaction components occurs to produce many irregular cells and yield a product resembling natural sponge.

The present invention is therefore based on the discovery that in order to obtain foam materials having a natural sponge structure, that is to say, materials containing both large pores and small pores in an irregular distribution, it is necessary locally to eliminate the foam-stabilizing action of the additive in order to produce a local "boiling" of the foam material. This "destabilizing" action is obtained by adding silicone defoaming agents. However, in order that these agents are not effective over the entire foaming mass, but only at locally defined positions, it is necessary, where these agents are themselves soluble in the polyether, for them to be fixed on a carrier substance which in its turn is insoluble in the polyether or which, when dissolved in a solvent, precipitates on being mixed with the polyether. The combination of defoaming agent and carrier substance present in the foamable mass as a dispersion causes a locally defined "boiling" of the foam, whereby the finally cured foam element possesses a natural sponge structure.

The invention is consequently concerned with a process for the production of foam materials containing urethane groups which have a natural sponge structure from linear or branched polyethers containing hydroxyl groups, polyisocyanates and water, in the presence of activators and stabilizers, and is characterized by the fact that the foaming is carried out in the presence of a silicone defoaming agent, alkyl polysiloxane or alkylaryl polysiloxane having a silicon content of preferably from about 10 to about 40 percent, applied to a carrier substance which is insoluble in the polyether.

Any suitable organic polyisocyanate may be used including aliphatic, aromatic, cycloaliphatic and heterocyclic organic polyisocyanates such as, for example, hexamethylene diisocyanate, decamethylene diisocyanate, p-phenylene diisocyanate, m-phenylene diisocyanate, 2,4- and 2,6-toluylene diisocyanate, 4,4'-diphenylmethane diisocyanate, benzidine diisocyanate, 1,5-napthalene diisocyanate, 1,4-cyclohexane diisocyanate, furfurylidine diisocyanate and the like as well as adducts of these diisocyanates and others which contain free —NCO groups and which are obtained by reaction of, for example, three mols of an organic diisocyanate with one mol of a trihydric alcohol such as, for example, trimehylol propane, glycerine, 1,2,6-hexanetriol, and the like or similar proportions of the same or different organic polyisocyanates with other polyhydric alcohols such as, for example, 1,4-butane diol, castor oil and the like as well as mixtures of these compounds. In addition, reaction products of the above-defined organic polyisocyanates with polyacetals such as those obtained from ethylene glycol and formaldehyde as well as the isocyanates disclosed in German patent specifications 1,022,789 and 1,027,394. Moreover, mixtures of these polyisocyanates may be used and are contemplated by the process of the present invention.

Any suitable polyhydric polyalkylene ether may be used such as, for example, the condensation product of an alkylene oxide either alone or together with a polyhydric alcohol. Any suitable alkylene oxide may be used, such as, for example, ethylene oxide, propylene oxide, butylene oxide, amylene oxide and the like. It is preferred to employ polyhydric polyalkylene ethers which have a molecular weight of at least about 500. It is also preferred to use polyhydric polyalkylene ethers obtained from alkylene oxides having from two to five carbon atoms, such as, for example, polypropylene ether glycol, polyethylene ether glycol, polybutylene ether glycol and the like or mixtures thereof. Moreover, the condensation product of the aforementioned alkylene oxides and a polyhydric alcohol having from two to four hydroxyl groups, such as, for example, ethylene glycol, propylene glycol, trimethylol propane, glycerol, triethanol amine, pentaerythritol and the like may be used. The poly hydric polyalkylene ethers may be prepared by any known process, such as, for example, by the process described by Wurtz in 1859 and in Encyclopedia of Chemical Technology, volume 7, pp. 257 to 262, published by Interscience Publishers, Incorporated, 1951, or in U.S. Patent 1,922,459.

It is preferred to carry out the process of the invention with polyhydric polyalkylene ethers which contain predominately secondary hydroxyl groups. It is also preferred to use polyalkylene ethers which have an —OH equivalent of from about 100 to about 3000. The —OH equivalent is the quantity of the polyether in grams which contains one hydroxyl group. Thus, the preferred polyhydric polyalkylene ethers are the pure polymers of 1,2-propylene oxide, 1,3-propylene oxide, 2,3-butylene oxide, styrene oxide, epihalohydrins such as epichlorohydrin and the like as well as addition products of these alkylene oxides with dihydric or polyhydric alcohols or phenols such as, for example, ethylene glycol, diethylene glycol, triethylene glycol and higher polyethylene glycols, 1,2-propane diol, 1,3-propane diol, 1,4-butane diol, 1,3-butane diol and higher alkane diols including for example, omega,omega'-decamethylene glycol, 2-hexene-1,4-diol, 2-hexine-1,4-diol, glycerine, 1,2,4-butane triol, 1,2,6-hexanetriol, pentaerythritol, trimethylol propane, hydroquinone, 4,4,'-dihydroxydiphenyl methane, 4,4'-dihydroxydiphenyl dimethyl methane, 4,4'-dihydroxydicyclohexyl methane, 4,4'-dihydroxydicyclohexyl dimethyl methane and dihydroxynaphthalenes; addition products of alkylene oxides with aliphatic or aromatic monoamines or polyamines containing a plurality of active hydrogen atoms, amino alcohols and the like such as, for example, ethanolamine, N-alkyl ethanolamines, such as N-methyl ethanolamine, diethanolamine, N - alkyl diethanolamines, N - ethyl diethanolamine, triethanolamine, ethylene diamine, aniline, tetramethylene or hexamethylene diamines and diethylene triamine, and addition products of alkylene oxides with compounds containing several hydrogen atoms which are capable of adding alkylene oxide, i.e. polyether groupings, such as, for example sugar, castor oil and the like.

It is also possible concurrently to use ethylene oxide in admixture with the aforementioned substituted ethylene oxides in the polymerization or addition reactions, for example in a quantity up to about 30 percent, it being possible for the incorporation of the ethylene oxide to be effected by copolymerization and also by subsequent attachment by polymerization.

The polyalkylene glycol ethers may also be used in admixture with other polyvalent hydroxy compounds, such as, for example, ethylene glycol, 1,4-butylene glycol, glycerine, trimethylol propane, pentaerythritol, tartaric acid esters, castor oil and the like.

Any suitable silicone oil may be used in accordance with the process of the present invention provided it is substantially insoluble in said polyether and/or sorbed on a carrier which is insoluble in the polyether. It is necessary that the silicone oil be insoluble in the polyether in order to provide for irregular distribution of this agent in the reaction mixture so that local boiling will be produced in the foaming ingredients to produce various sizes in the resulting cells. The preferred type of silicone oils are those polysiloxanes which have recurring structural units of the formula $\{O-Si(R_2)\}$ wherein R is an alkyl radical or an aromatic radical with the proviso that not more than 50 percent of the radicals represented by R in the formula are aromatic radicals. Of course, the preferred radicals for economic reasons are methyl radicals and phenyl radicals and the pure polydimethyl siloxanes which contain terminal —Si—$(CH_3)_3$ groups are most preferred. The viscosity of the silicone oil may vary over a wide range but it is preferably within the range of from about 0.5 to about 25000 centistokes at 25° C.

Any suitable carrier substance which is substantially insoluble in the polyether may be used such as, for example, plastics such as polystyrene, polyvinyl acetate, acetyl cellulose as well as natural substances such as lecithin, diatomaceous earth, zirconium silicate, sodium aluminosilicates and particularly those disclosed in U.S. Patent 282,244 and the like. The amount of silicone oil may be varied over a wide range but it is preferably within the range of about 0.001 percent to about 5 percent and best results are obtained when the amount is controlled to amounts of from about 0.001 percent to about 0.1 percent by weight based on the weight of the polyhydric polyalkylene ether.

The combination of silicone oil and carrier may be produced by forming a paste or they may be be combined in solution. Thus, the silicone oil may be sorbed on a carrier. The silicone oil on the carrier is preferably dispersed in the polyether prior to the mixing step, but the combination of silicone oil and carrier may also be added directly when mixing the reaction components and, if desired, continuously. However, to facilitate accurate measurement and to obtain more homogeneous distribution, it is preferred to first prepare a dispersion of the silicone oil-carrier substance in the polyether which is to be employed as one of the reaction components and then add this dispersion to the balance of the reaction mixture in a single mixing step.

The invention is carried out in a simple and convenient manner by combining the organic polyisocyanate the polyhydric polyalkylene ether which may or may not contain the silicone oil and carrier together with water or other blowing agent such as, for example, dichlorodifluoromethane as well as other halohydrocarbons in a single mixing step. Suitable procedures and equipment for carrying out such a process are disclosed in U.S. Reissue Patent 24,514. It is preferred to combine the polyhydric polyalkylene ether and organic polyisocyanate with the silicone oil and carrier therefor, a dialkyl tin salt of a dicarboxylic acid such as dibutyl tin dilaurate, a tertiary amine such as endoethylene piperazine, a divalent tin alcoholate such as stannous octoate and/or a water soluble silicone alkylene oxide copolymer such as that described in U.S. Patent 2,834,748. The preferred compound being one having the formula

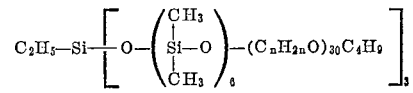

wherein ($C_nH_{2n}O$) is a mixed polyoxyethylene and oxypropylene block copolymer containing about 17 oxyethylene units and about 13 oxypropylene units.

It is possible by the aforementioned simple steps to obtain foam materials with a polyether base and which contain urethane groups, which foam materials have a natural sponge structure in addition to possessing the other favorable mechanical properties of cellular polyurethane plastics.

The cellular polyurethane plastics of the present invention are useful for the production of articles such as those prepared from natural sponge including cleaning equipment, for example, floor mops and the like.

The invention is further illustrated by the following examples in which the parts are by weight unless otherwise indicated.

*Example 1*

About 200 grams of approximately a 10 percent polystyrene solution in benzene are mixed with about 20 grams of a linear polydimethyl siloxane which was a viscosity of about 1000 cp. and the general formula

wherein $n$ is about 320, it also being possible to add from about 200 to about 500 grams of pigment dyestuff for coloring the foam and for stabilizing the dispersion by increasing the viscosity. This mixture is introduced in a thin jet and with vigorous stirring into about 3 kilograms of polypropylene ether glycol to prepare a dispersion, hereinafter referred to as dispersion I.

By using this dispersion I and after thoroughly mixing approximately the indicated parts of the following components:

100 parts of a polypropylene ether glycol (—OH number about 56)

36 parts of an 80:20 mixture of 2,4- and 2,6-toluylene diisocyanate
2.7 parts of water
1.5 parts of a water soluble silicone alkylene oxide copolymer having the formula

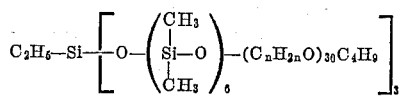

wherein $(C_nH_{2n}O)$ is a mixed polyoxyethylene and oxypropylene block copolymer containing about 17 oxyethylene units and about 13 oxypropylene units
0.3 part of endoethylene piperazine
0.05 part of dibutyl tin dilaurate
1-5 parts of dispersion I a foam material with a natural sponge structure is obtained.

*Example 2*

About 100 grams of approximately a 20 percent lecithin solution in toluene are mixed with about 15 grams of a linear polydimethyl siloxane (viscosity about 800 cp.) This solution is now dispersed in about 1 kilogram of a weakly branched polypropylene ether glycol while stirring vigorously to prepare a dispersion hereinafter referred to as dispersion II. By using this dispersion II and after thoroughly mixing approximately the indicated parts of the following components:

100 parts of a linear polypropylene ether glycol (—OH number about 52)
38 parts of an 80:20 mixture of 2,4- and 2,6-toluylene diisocyanate
2.9 parts of water
1.2 parts of a water soluble silicone alkylene oxide copolymer of Example 1
0.25 part of endoethylene piperazine
0.8 part of dimethyl benzylamine
0.5 part of stannous octoate
1-5 parts of dispersion II a white foam material having pores like natural sponge is obtained.

*Example 3*

About 200 grams of a solution of acetyl cellulose (about 10 percent in acetone) are mixed with about 30 grams of a methyl phenyl polysiloxane (viscosity about 1100 cp.) having the general formula $(CH_3)_3Si-O-[Si(C_6H_5)_2-O-$
$Si(CH_3)_2-O]_n-Si(CH_3)_3$ wherein $n$ is about 50–100. This mixture is incorporated by mixing into about about 1 kilogram of a colored paste consisting of about 800 grams of trichloroethyl phosphate and about 200 grams of cadmium sulfide as pigment. The mixture is dispersed in about 3 kilograms of polypropylene ether glycol to prepare a dispersion hereinafter referred to as dispersion III.

After mixing approximately the indicated parts of the following components:

100 parts of a polypropylene ether glycol (—OH number about 60)
38 parts of an 80:20 mixture of 2,4- and 2,6-toluylene diisocyanate
2.7 parts of water
1.5 parts of a water soluble silicone alkylene oxide copolymer of Example 1
0.4 part of endoethylene piperazine
0.1 part of dibutyl tin dilaurate
1-5 parts of dispersion III a yellow foam material with pores like natural sponge is obtained from the foaming reaction mixture.

*Example 4*

About 25 grams of carrier substance, consisting of about 70 percent zirconium silicate and about 30 percent diatomaceous earth, are formed into a paste with about 25 grams of a linear polydimethyl siloxane (viscosity about 1040 cp.). This paste is mixed with about 1 kilogram of a colored paste consisting of about 30 parts of pigment dyestuff and about 70 parts of a linear polypropylene ether glycol, and the mixture is diluted with about 2.5 kilograms of polypropylene ether glycol to prepare a dispersion hereinafter referred to as dispersion IV.

After thoroughly mixing approximately the indicated parts of the following components:

100 parts of a polypropylene ether glycol (—OH number about 55)
40 parts of an 80:20 mixture of 2,4- and 2,6-toluylene diisocyanate
2.9 parts of water
1.4 parts of a water soluble silicone alkylene oxide copolymer of Example 1
0.35 part of endoethylene piperazine
0.1 part of dibutyl tin dilaurate
1-5 parts of dispersion IV a colored foam material having pores like natural sponge is obtained from the foaming reaction mixture.

*Example 5*

About 100 grams of polyvinyl acetate are melted down and mixed with about 20 grams of a polydimethyl siloxane. The solidified melt is comminuted in a mill and the powder is distributed in a trituration of about 500 grams of pigment dyestuff in about 3 kilograms of polypropylene ether glycol to prepare a dispersion hereinafter referred to as dispersion V.

After thoroughly mixing approximately the indicated parts of the following components:

100 parts of a polypropylene ether glycol (—OH number about 56)
37 parts of an 80:20 mixture of 2,4- and 2,6-toluylene diisocyanate
1.0 part of a water soluble silicone alkylene oxide copolymer of Example 1
2.7 parts of water
0.45 part of endoethylene piperazine
1-5 parts of dispersion V a white foam material with relatively fine natural sponge pores is obtained.

It is to be understood that any other suitable organic polyisocyanate, polyhydric polyalkylene ether, silicone oil, carrier and the like could have been used in the preceding examples in accordance with the foregoing disclosure and that said examples are only for illustration.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method for the production of cellular polyurethane plastics having a porous structure resembling that of natural sponge which comprises mixing a polyhydric polyalkylene ether having a molecular weight of at least about 500 with an organic polyisocyanate in the presence of a blowing agent substantially simultaneously in one step in the presence of from about 0.001 percent to about 5 percent by weight based on the weight of said polyhydric polyalkylene ether of a polysiloxane consisting of recurring structural units of the formula $+O-Si(R)_2+$ wherein R is selected from the group consisting of alkyl and aryl radicals, not more than about 50 percent by weight of the polysiloxane being said aryl radicals, said polysiloxane being sorbed on a carrier which is substantially insoluble in the polyhydric polyalkylene ether and having a viscosity within the range of from about 0.5 to about 25,000 centistokes at 25° C. and a water soluble silicone alkylene oxide copolymer and allowing the resulting mixture to foam to form said cellular polyurethane plastic.

2. The method of claim 1 wherein said water soluble silicone alkylene oxide copolymer has the formula

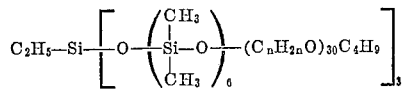

wherein $(C_nH_{2n}O)$ is a mixed polyoxyethylene and oxypropylene block copolymer containing about 17 oxyethylene units and about 13 oxypropylene units.

3. The method of claim 1 wherein said carrier is a sodium aluminasilicate.

4. The method of claim 1 wherein said carrier is lecithin.

5. The method of claim 1 wherein said carrier is zirconium silicate.

6. The method of claim 1 wherein from about 0.001 percent to about 0.1 percent by weight of the polysiloxane is used based on the weight of the polyhydric polyalkylene ether.

7. The method of claim 1 wherein said polysiloxane has recurring structural units of the formula $$\pm O-Si(CH_3)_2\pm$$

and terminated by $-Si-(CH_3)_3$ groups.

8. The method of claim 1 wherein said polysiloxane has the formula

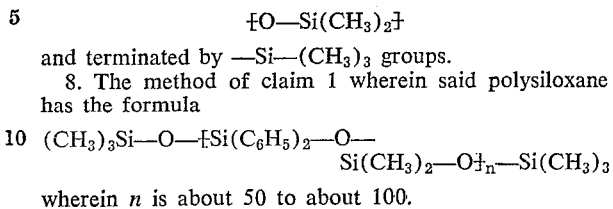

wherein $n$ is about 50 to about 100.

References Cited in the file of this patent
UNITED STATES PATENTS

| | | |
|---|---|---|
| 2,955,056 | Knox | Oct. 4, 1960 |
| 3,007,883 | Schmidt et al. | Nov. 7, 1961 |
| 3,034,996 | Kaplan | May 15, 1962 |
| 3,073,787 | Krakler | Jan. 15, 1963 |

FOREIGN PATENTS

| | | |
|---|---|---|
| 1,153,994 | France | Oct. 21, 1957 |